J. Spratt,
Fruit Jar,
Nº 9,995.           Patented Sep. 6, 1853.
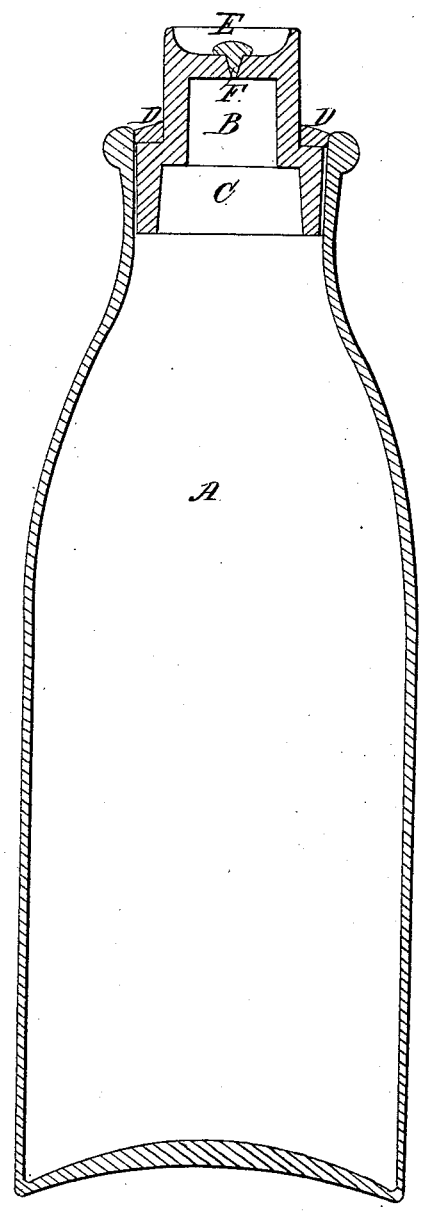

UNITED STATES PATENT OFFICE.

JAMES SPRATT, OF CINCINNATI, OHIO.

IMPROVEMENT IN BOTTLE-FASTENINGS.

Specification forming part of Letters Patent No. 9,995, dated September 6, 1853.

*To all whom it may concern:*

Be it known that I, JAMES SPRATT, of Cincinnati, Hamilton county, Ohio, have invented certain new and useful Improvements in Apparatus for Preserving Edible Substances; and I do hereby declare the following to be a full, clear, and exact description of the same, reference being had to the annexed drawing, making part of this specification.

As there are many objections to preserving edibles in tin, not the least of which is the known action which the acids of most articles which it is desirable to preserve have in decomposing the tin and solder, and the injurious effects resulting from the oxides of the metals amalgamating with the food, a cheap and expeditious method of hermetically sealing glass bottles or jars has long been held to be a desirable object. The impracticability of so sealing in a whole stopper at once, such as would fill the neck of the vessel, experience has long since taught all who have tried it, as the sealing operation has to be performed while the contents of the bottle or jar are maintained at the boiling-point by immersion in a vessel of water or sand, heated sufficiently to produce the desired effect—that is, to generate sufficient steam in the bottle or jar for the expulsion of the atmosphere—and it is while the contents of the bottle or jar aforementioned are in this state of ebullition that the sealing hermetically has to be effected. To readily and effectually perform this operation is the object of my present invention, the devices having more especial reference to the preservation of viands which have been previously boiled for that purpose.

In the accompanying drawing, a bottle furnished with my device for hermetically sealing is represented by a central section.

A is the bottle. B is a stopple ground to fit the neck of said bottle. The barrel C of the stopple is made of such dimensions with respect to the neck as that the top of the stopple shall sink a little below that of the neck, so as to afford facility for the application of cement D to the joint with which the stopple is secured in the bottle, preparatory to final sealing of the same. The barrel of the stopple is made hollow in order that there may not be any large body of glass to retain the heat, and thereby render the final sealing a matter difficult to accomplish. The top of the handle of the stopple is dished or sunk, so as to form a small basin or cup, E, in the center of which cup is a small orifice, F, opening into the hollow interior of the stopple. This orifice is of a conical form, presenting at its lower extremity a very minute passage into the interior of the bottle, which passage is, however, sufficiently large for the escape of the atmosphere when expelled by the agency of the steam, as before mentioned.

The process is as follows: A number of bottles being filled with the provisions in a warm condition, the stopples are inserted and cemented, as before described, wire or twine being used in addition to the cement when it is thought advisable. The bottles are then immersed to the neck in boiling water, or sand so heated as to effect the same purpose. The time for sealing is denoted by the change in the appearance of the steam. On first escaping from the bottle, the air escaping at the same time with it, the steam appears translucent, but soon becomes transparent, and, finally, nearly invisible, which denotes the expulsion of the air from the bottle, and the moment for sealing, when a few drops of wax, gum-shellac, resin, or other suitable substance are melted into the orifice F until it is filled, and the wax or gum overflows slightly the bottom of the cup E, when said cup is filled with cold water, and the sealing material thereby effectually consolidated.

In the customary process it is found that a little excess of steam within the bottle is apt to force the wax out, or on the steam condensing within the bottle the wax is liable to be driven by atmospheric pressure into the vacuum thus created; but the application of cold water, cooling at once the stopple as well as the sealing-wax, makes it perfectly secure.

Experience in the old method of sealing as practiced heretofore has taught me that it could not be relied upon, leakage frequently occurring, and loss, of necessity, as frequently resulting therefrom. In my present method the small surface of the sealing material exposed to the action of the steam within the bottle, precludes the possibility of its being forced outward, while the conical form of the aperture as effectually prevents the pressing in of the seal by the atmosphere.

I am aware that glass stoppers with holes through them have been used in specific gravity bottles—such as making these stoppers of pieces of glass tube ground into the mouths of these bottles; but they have not had the cavity E in connection with the conical aperture. I confine myself to the construction of the cavity and aperture, and hence

What I claim, and desire to secure by Letters Patent, is—

The application of the cup or cavity E and aperture F, for sealing preserved edible substances, as set forth.

In testimony whereof I have hereunto set my hand before two subscribing witnesses.

JAMES SPRATT.

Witnesses:
  GEO. H. KNIGHT,
  J. H. GETZENDANNER.